INVENTORS
KLAUS Clusius &
Max Huber

ATTORNEYS

United States Patent Office 3,152,062
Patented Oct. 6, 1964

3,152,062
SEPARATION OF SUBSTANCES BY COUNTER-FLOW MIGRATION IN AN ELECTRIC FIELD
Klaus Clusius, Zurich, and Max Huber, Winterthur, Switzerland, assignors to Ciba Limited, Basel, Switzerland, a Swiss firm
Filed Sept. 2, 1959, Ser. No. 837,653
Claims priority, application Switzerland, Sept. 3, 1958, 63,555; July 22, 1959, 76,061
2 Claims. (Cl. 204—301)

The invention relates to the separation of substances by counter-flow migration in a solution under the influence of an electric field.

This type of process is usually used to separate two substances each of which is composed of charged particles, which may be either anions or cations, the velocity of the charged particles of which one of the substances is composed being dicerent from the velocity of the charged particles of which the other substance is composed. Assuming that, as is usually the case, the particles of the two substances have charges of the same sign, the solution (which is generally aqueous) is arranged to flow in a direction opposite to the direction in which the charged particles are caused to migrate by the applied electric field, the velocity of flow of the solution being selected so as to lie between the velocities of the faster and slower charged particles. The faster particles migrate against the flow of the solution whereas the slower particles are carried with the solution, and thus separation is effected. The charged particles may be either organic or inorganic, and the same type of process may also be used to separate other kinds of substance, for example, it may be used to separate a substance composed of charged particles from a substance composed of uncharged particles.

A disturbing factor in processes of this type is convection, which may be caused by thermal or other effects and which tends to counteract the separation effected by the counter-flow migration. A number of ways of obviating this disturbing effect have previously been proposed. Thus, it has been proposed to fill the column used for the separation with a porous mass, for example, sintered glass or sand, whereby the column is subdivided into a large number of channels. This proposal has the disadvantage that, owing to the different sizes of the channels so formed, adjustment of the counter-flow and migration velocities may be achieved only by way of average, but not for each individual channel. This had led to the further proposal to subdivide the entire column into individual part-columns arranged in series with one another, intermediate compartments being arranged between these part-columns in which some compensation of the disturbing irregularities, caused by the pore irregularities, can be effected.

Not even all these steps are sufficient, however, to achieve the theoretically possible degree of separation, e.g. to attain a separation that corresponds to the theoretical number of calculated plates of such a separating column. Thus, in these proposed arrangements, an extension of the effective length of the separating column does not result in a corresponding increase in the degree of separation because the degree of separation per unit length of the column usually decreases as the length of the column increases.

The present invention provides a process for separating substances by counter-flow migration, wherein the substances to be separated are dissolved or dispersed in a liquid medium which is caused to flow through a plurality of compartments in turn, an electric field is applied in or against the direction of flow of the medium through the compartments, the length of each compartment in the direction of flow being such as to allow convection to take place within the compartment substantially only in a direction perpendicular to the direction of flow, and communication between adjacent compartments being provided by a plurality of channels of substantially the same dimensions as one another.

The invention also provides an apparatus suitable for carrying out the process.

Advantageously, the mixture of substances to be separated is added near the center of the counter-flow column consisting of series-arranged compartments, the fractions accumulated in the direction of, or in opposition to, the counter-flow being withdrawn at points removed from the electrode-containing compartments by one or more compartments. Thus there are situated between the electrodes placed at the end of the counter-flow column and the points at which the accumulated faster or slower fractions are withdrawn, one or more compartments which are also connected to one another by channels in the manner proposed by the invention. These sections of the counter-flow column are called the de-ionizing sections. The upstream de-ionizing section is situated between the counter-flow entry point and the point at which the faster ion is withdrawn, whereas the downstream de-ionizing section is situated between the point at which the slower ion is withdrawn and the counter-flow discharge point. The de-ionizing section is intended, on the one hand, to prevent ions to be separated from reaching the electrodes and from possibly undergoing a change at the electrodes (which is of particular importance in the case of organic ions) and, on the other hand, to free the solvent from ions to be separated so that it can be recirculated in the apparatus.

If contact between the ions to be separated and the electrodes is permissible, that is if the first-mentioned condition does not obtain, the upstream de-ionizing section may be omitted, i.e. the fast ions may be withdrawn from the electrode compartment itself.

In the upstream de-ionizing section, both the fast and slow ions should be washed downstream. This is achieved by making the field strength smaller, or the counter-flow stronger, than in the separating section. Reduction of the field strength is effected by the addition of an auxiliary ion which travels faster even than the faster of the ions to be separated, and which is so selected that it is simple to separate afterwards. A somewhat increased counter-flow is obtained by the superimposition of the additional liquid which is withdrawn at the upstream withdrawal (tapping) point. The amount of this additional flow, on the other hand, is limited by other conditions so that the second solution can usually not be carried out in connection with the upstream de-ionizing section.

If for the separation of ions a weak acid or alkaline solution is employed as a solvent or, strictly speaking, if the opposed ion is the anion of a weak acid (or the cation of a weak alkaline solution), then this acid (or alkaline solution) can be withdrawn at the downstream end of the downstream de-ionizing section in a practically pure state, that is free from ions accumulated in the direction towards the anode (cathode) and may be directly re-cycled to the cathode (anode) end. This effect can be explained by the fact that, when a weak acid is employed, the number of anions (if the inconsiderable self-dissociation of the acid is neglected) is always equal to the number of the cation to be separated, irrespective of the acid concentration. If the number of cations to be separated is made smaller than in the separating section, then, with an equal current, there will be higher field strength in the deionizing section so that in this case the slow ions also travel faster than the counter flow. This leads the ion concentration to drop steeply to zero in the de-ionizing section. A condition for this is the employment of a weak acid (or alkaline solution), that is to say, the absence (or the presence of only a very small amount) of charge carriers different from those of the substances to be separated.

It is also possible to withdraw a practically pure electrolyte from the de-ionizing section at one end and to recirculate it to the other end when a strong acid is employed by using an additional electrode to maintain a higher field strength in the de-ionizing section than in the actual separating section of the separation column.

The process may be applied to the separation of ions with different migration velocities in isotope mixtures.

It is also possible to use the process for the separation of substances in which an exchange equilibrium between one ion and a compound having a charge of different polarity is exploited. In this case, ion migration aids separation only indirectly in that it makes possible a counterflow as between the ion and the compound. This will now be explained, by way of example, with reference to the following exchange equilibrium:

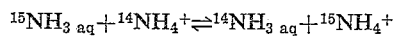

$$^{15}NH_{3\ aq} + {}^{14}NH_4^+ \rightleftharpoons {}^{14}NH_{3\ aq} + {}^{15}NH_4^+$$

The $NH_4 \cdot$ ions move forward in the electrical field, the $NH_3$ is washed back with the counter flow since it is without charge. At the cathode, the $NH_4^+$ is discharged to $NH_3$ and moves back again until it reaches the de-ionizing section. Since the latter is acid, an $NH_4 \cdot$ ion is again produced which will again move forward. $NH_4 \cdot$ and $NH_3$ continuously flow past one another within the counter-flow, and if the equilibrium constant differs from 1, separation occurs along the system.

Usually such exchange processes are carried out in the homogeneous aqueous phase, but the process can also be carried out between an ion in the aqueous phase and a compound containing the substance of this ion and dissolved in a solvent emulsified in water but not miscible with water. The process can equally be carried out between an ion in the aqueous phase and a solid absorption agent emulsified in water. The employment of anhydrous solvents is also possible.

The apparatus used for this process advantageously contains separating walls dividing the counter-current trough into individual chambers and consisting of fine-pored material, the space between the walls being so selected that sufficient convection—perpendicular to the direction of the current can take place between them. This is usually the case when the space is several times the wall thickness. The size of the individual channels or pores may deviate at most insignificantly from a mean value. Advantageously the channels or pores are all of the same diameter and of the same length. Especially advantageous as separating walls are fine-meshed sieves, e.g. of nylon.

A number of embodiments of the invention will now be described by way of example in greater detail with reference to the accompanying drawings in which.

Figure 4:
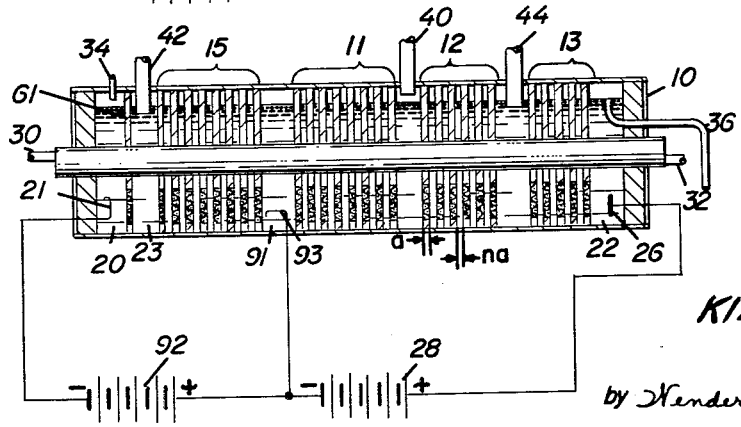
FIG. 4 is a diagrammatic axial section of a third form of apparatus constructed in accordance with the invention.

In FIG. 4, the designations "a" and "na" indicate that the distance *between* the walls is several times greater than the wall thickness per se, "n" being a number greater than unity. The above applies to all figures even though labelled only in FIG. 4.

Figure 1:
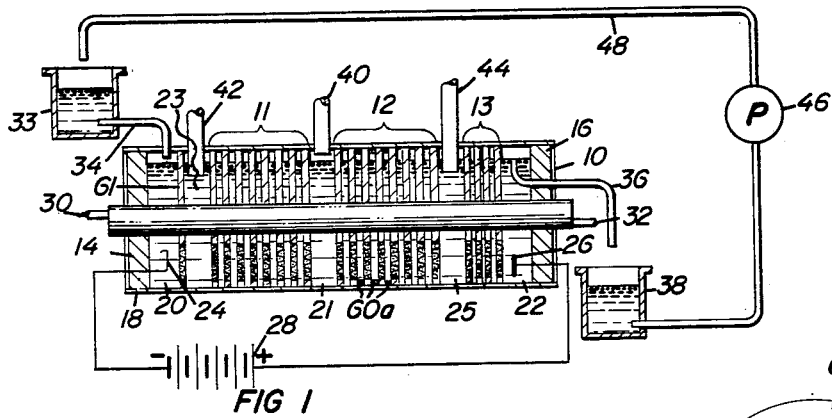
FIG. 1 is a diagrammatic axial section of one form of apparatus constructed in accordance with the invention.
Figure 2:
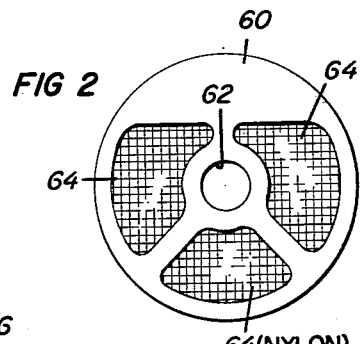
FIG. 2 is a diagrammatic end elevation of one of the partitions of the apparatus shown in FIG. 1.

Referring to FIG. 1 of the drawings, the apparatus comprises a horizontally extending separating column, which consists of a central tube 10 into which partitions 60, one of which is illustrated in FIG. 2, are fitted at different intervals. Between adjacent partitions, compartments of different length are formed. Groups of short compartments form the sections designated by reference numerals 11, 12 and 13. The section of the column designated by reference numeral 11, which is situated between a feed point (feed reservoir) compartment 21 and the cathode 24, may be referred to as the "rectifier" section, and section 12, which is situated between the longer compartment 21 and the longer compartment 25 may be referred to as the "stripper" section. Section 13, which is situated between the anode reservoir 25 and the anode compartment 22, constitutes a de-ionizing section.

The column is terminated at its ends by plates 14 and 16, and the assembly is enclosed by a sheath 18, for example an elastic skin or a tube making a close fit with the partitions, so that the whole assembly constitutes a tubular trough. The partitions 60 are kept strictly parallel to one another by means of spacers 60a (only a few of which are shown) and form the end wall of the individual compartments. In the two terminal compartments, namely the cathode compartment 20 and the anode compartment 22, there are respectively located the cathode 24 and the anode 26, which are connected to a current source 28. Due to the subdivision of the entire counter flow column by the partitions 60 into the above-mentioned compartments, convection occurs preferably only in a direction perpendicular to the direction of counter flow. For exchanging the heat generated by the passage of current, a coolant is passed through the center tube by means of conduits 30 and 32. Cooling is also effected at the surface of the sheath 18. The counter flow is set up by feeding a solvent to the cathode compartment 20 from a supply vessel 33 through a conduit 34, and draining the solvent off from the anode compartment 22 through an overflow pipe 36 into a collecting vessel 38. The substances to be separated are introduced at the center of the separating column into the compartment 21 (the feed reservoir) through a tube 40. The fast ions, accumulated in opposition to the flow of solvent, are withdrawn through a tube from the tapping compartment 23 which is located adjacent the anode compartment 20 and separated from the latter by a partition 61 similar to the partitions 60. The slow ions carried along with the solvent are withdrawn from the tapping compartment 25, adjacent the anode compartment 22 through a tube 44.

If, as referred to above, a weak acid, for example dilute acetic acid is used as the solvent, the acid which reaches the anode compartment 22 after passing through the de-ionizing section 13, does not contain any extraneous ions. The acid accumulating in the vessel 38 may then be fed back into the storage container 33 by way of a conduit 48.

The partitions are made of a fine-pored material. They may be, for example fine-mesh sieves. Thus they provide a large number of channels through which both the solvent and the substances to be separated can flow from one compartment to the next and, as explained above, it is important that the channels should all be of substantially the same dimensions. When the partitions are made of fine mesh sieves, the sizes of the meshes and the thickness of the sieves should not deviate more than a small amount from the mean values.

A preferred partition such as shown in FIG. 2 of the drawings consists of a non-permeable carrier plate 60 having a central bore 62 to receive the center tube. The major part of the remaining area of the partitions is open and the apertures 64 covered with a fine mesh material, for example, nylon.

As described above, the substances to be separated are introduced into the feed reservoir 21 through the tube 40 situated near the middle of the column. Under the influence of the electric field, the fast ions travel in a direction opposite to that of the flow of solvent and reach the compartment 23 from which the discharge conduit 42 leads. The slow ions are carried along by the current of solvent and reach the compartment 25 from which the discharge conduit 44 leads. In the intervening spaces between the individual partitions, eddies produced by heating etc. cause movement of the liquid in a direction perpendicular to the axis of the column. Movement of the solvent in that direction in the spaces is also produced by convection, which is caused by temperature gradients extending in that direction, that is to say, in a direction perpendicular to the axis of the column. These temperature gradients result from cooling at the outer skin 18 and at the center tube 10. This convection causes continuous mixing of the liquid in each compartment and removes any irregularities that may have resulted from the passage of the liquid through the adjacent partition on the upstream side of the compartment, with the result that the liquid thus enters the channels of the adjacent partitions on the downstream side of the compartment with uniform concentration and velocity. The distance between adjacent partitions must not be so small as seriously to impede this convection. Usually, the distance between adjacent partitions should be large compared with the wall thickness of the porous parts of the partitions, and the minimum satisfactory length of the compartments also depends upon the column diameter. Thus, for example, if the outer diameter of the column is 80 millimeters, intervals within the range of from 1 to 2 millimeters are required between the partitions.

By the series arrangement of convection compartments and partitions consisting of fine-pored material permeable to both the liquid and the substances to be separated, a high uniformity of counter flow and ion migration is achieved so that the correct relationship between the velocity of flow of the liquid and the velocities of the ions is maintained in practically all sections of the column. Inevitable fluctuations, due to manufacturing tolerances, the sizes of the pores (fineness of the mesh) are compensated in the intervening convection compartments. In this way, irregularities such as occur in extended non-divided columns due to the fact that discrepancies initiated by pore size deviations increase to a higher power of the initial irregularities, are avoided. At the same time, the employment of material of pores of which are very uniform, minimizes the occurence of the initial disturbances. This has the result that the degree of separation obtainable increases in proportion with the length of the separating column. The theoretical plate number is very high and, if the length of the column is increased, remains proportional to the length of the column.

The horizontally extending column is filled only to a certain height (see FIG. 1) and the partitions are non-permeable above the liquid level (see FIG. 2). In the space above the surface of the liquid, there may accumulate gas bubbles which, if this space did not exist, may adversely affect the separation process by, for example, clogging up the pores in the partitions.

The compartments that are formed by the partitions of section 13 and are situated between the compartment from which the draining conduit 44 leads and the anode compartment 22, constitute a de-ionizing section. Here, as has been mentioned above, the field strength is increased in the stationary condition when a weak acid (or alkaline solution) is employed, and this has the result that, in the de-ionizing section, the velocity of both the slower and the faster ions are greater than the velocity of flow of the liquid. Here, therefore, not even the slow ions reach the anode compartment 22 so that the liquid draining off through the overflow conduit 36 is the pure solvent and does not contain either of the substances to be separated. This solvent can now be re-circulated to the cathode compartment without disturbing the separation process. The plant thus operates without consuming chemicals and with a liquid volume scarcely exceeding the capacity of the column.

Figure 3:
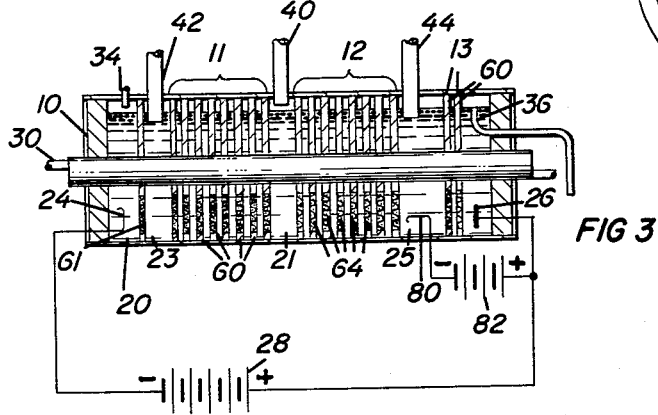
FIG. 3 is a diagrammatic axial section of a second form of apparatus constructed in accordance with the invention.

In FIG. 3 of the drawings, there is shown a form of apparatus in which, in the de-ionizing section, additional current is generated by an additional electrode 80. The auxiliary electrode 80 is connected to the anode 26 through a current source 82. Otherwise the apparatus is the same as the apparatus shown in FIG. 1, the device for re-circulating the opposed ion having been omitted for clarity's sake. This device is used, when a strong acid (or alkaline solution) is employed as the opposed ion.

Because the rate at which separation is effected is proportional both to the electric current and to the mole fraction of the substances contained in the solvent, the current consumption necessary to achieve a given rate of separation will be lower the higher the mole fraction. To save current, it is possible, therefore, to build up the whole arrangement from several cascade connected elements. It is also possible, however, to use a single separation column of constant diameter and to fit several auxiliary electrodes of the type shown in FIG. 3 by means of which the current is increased towards the end of the column and the current thus correctly related to the mole fractions obtaining in the various sections of the column. The counter flow velocity is the same over the whole column, the overall concentration drops in sections where the current is lower so that the adjustment period of the whole system becomes shorter. An arrangement of this kind is much simpler than an arrangement comprising several columns in cascade connection.

In FIG. 4 of the drawings, there is shown an apparatus incorporating a simplified cascade arrangement in which the cascade effect is achieved by a change of current strength along the column in only one step. This apparatus differs from that shown in FIG. 1 in that it comprises a second counter flow path provided with partitions 15 which is supplied by a current source 92. The circuits of the two current sources 28 and 92 have a common electrode in the compartment 91. Energy consumption per centimeter of column length and also the concentration in that section of the cascade arrangement which is supplied by the current source 92 are only half the corresponding values for the section supplied by the current source 28. Thus, the overall energy consumption and the adjustment period of the system become reduced as compared with that of a simple column of the kind shown in FIG. 1 arranged to achieve the same rate of separation. The ideal solution would be, according to the cascade theory, to adapt the current continuously to the mole fraction as it changes along the column, but this results in a very complex arrangement and a compromise using merely two, or not many more, cascade stages is usually to be preferred. In the apparatus shown in FIG. 4 there can be separated, for example, a mixture containing 72% of one substance. In compartment 91 the concentration of the substance is 89%, and in the cathode compartment 23 it is 96%, whereas the original mixture is diluted to 64% in the anode compartment 25.

The following examples illustrate the invention:

*Example 1*

For the separation of nitrogen isotopes, there was used a separation column of which the construction was basically the same as that shown in FIG. 1 and of which the relevant data were as follows:

| | | |
|---|---|---|
| Column diameter | centimeters | 4 |
| Cooling tube diameter | do | 1.1 |
| Overall length | do | 14.7 |
| Length of the cathode compartment 20 | do | 3.0 |
| Length of the cathode reservoir 23 | do | 3.0 |
| Length of the separator sections 11, 21 and 12 | centimeters | 5.9 |
| Length of the anode reservoir 25 | do | 2.5 |
| Length of the de-ionizing section 13 | do | 1.5 |
| Length of the anode compartment 22 | do | 1.8 |

Example 1—Continued

Number of plates in the separator section _____ 28
Number of plates per centimeter of the separator section _____ 4.75
Number of plates in the de-ionizing section ____ 6
Permeable area of each partition ___ sq. centimeters _____ 4.65

The data relating to the process were as follows:

Current strength ____ 0.775 amp.
Solvent _____ Aqueous solution of acetic acid.
Rate of flow of solvent _____ 5.82 cubic centimeters per minute.
Acetic acid concentration _____ 0.50 mol per liter.
Concentartion in the solvent of the ions to be separated ____ 0.05 mol per liter.
Mean operating temperature _____ 88° C.
Voltage without de-ionizing section ___ 143 volts.
Voltage across the de-ionizing section . 98 volts.

The thickness of the separator plates was within the range of from 0.6 to 0.8 millimeter, and the permeable parts of the partitions were formed of a nylon mesh with $50\mu$ apertures and a visible area of 38%.

The separation of nitrogen isotopes in this case is based on the different mobilities of the isotope $NH_4^-$ ions. The $^{15}N$ content of the ammonia employed amounted to 2.94% $^{15}N$. The apparatus was run in "closed" operation, which means that material was neither added nor removed. From time to time samples were removed at either end and were analysed. The separation $\Delta_\gamma$ (difference of the mole fraction $\gamma$ between cathode compartment and anode compartment) at various times after the start of the experiment was as follows:

| Time in hours | $\Delta_\gamma$, percent | Separation factor $q$ |
|---|---|---|
| 6.5 | 0.45 | 1.168 |
| 24.5 | 1.16 | 1.504 |
| 100 | 1.60 | 1.76 | where $$q = \frac{\left(\frac{\gamma}{1-\gamma}\right) \text{cathode compartm.}}{\left(\frac{\gamma}{1-\gamma}\right) \text{anode compartm.}}$$

From these data it is possible to estimate the differential mobility of the two isotopes. Accordingly, the difference amounts to: $\epsilon = 1.3 \cdot 10^{-3}$. The separation after 100 hours (according to the relation $p = (1+\epsilon)^{pl}$) corresponds to 428 theoretical plates, or, in relation to the length of the separator section, to a theoretical plate number of 72.5 plates per centimeter.

Example 2

For the separation of nitrogen isotopes, there was used a separating column of which the construction was basically similar to that used in Example 1, but which differed in respect of the following data:

Column diameter _____ centimeters__ 4.0
Cooling tube diameter _____ do____ 1.1
Overall length _____ do____ 19.7
Length of the cathode compartment 20 ____do____ 3.8
Length of the cathode reservoir 23 _____ do____ 3.8
Length of the separator sections 11, 21 and 12 _____ centimeters__ 10.8
Length of the anode reservoir 25 _____ do____ 1.5
Length of the de-ionizing section 13 _____do____ 2.0
Length of the anode compartment 22 _____do____ 1.1

Example 2—Continued

Number of plates in the separator section _____ 12
Number of plates per centimeter of the separator section _____pl./cm.___ 1.1
Number of plates in the de-ionizing section _____ 4
Permeable area of each partition __sq. centimeters__ 1.0

The operating conditions differed from those of Example 1 in the following respects:

Current _____ 0.084 amp.
Rate of flow of solution _____ 0.702 centimeter per minute.
Acetic acid concentration _____ 0.0504 mol/liter.
Concentration of ions to be separated in the solvent _____ 0.05 mol/liter.
Mean operating temperature _____ 19° C.
Voltage without de-ionizing section _____ 181 v.
Voltage across the de-ionizing section _____ 120 v.

The construction of the partitions was otherwise the same as that of the partitions used in Example 1.

In this example, the separation of nitrogen isotopes is based on the exchange equilibrium:

$$^{15}NH_{3\,aq} + ^{14}NH_4{}^\cdot = ^{14}NH_{3\,aq} + ^{15}NH_4$$

According to Urey, the equilibrium constant at 25° C. is:

$$K = 1.028$$

The velocity and concentration of the solution was such that the ratio of $NH_3$ to $NH_4{}^\cdot$ was just 1:1. In order that the $NH_{3\,aq}$ should not evaporate, the apparatus was closed at the top. It was important that no $NH_3$ should reach the cathode compartment, because it would there be washed away by the escaping hydrogen. In order to prevent this, 3 partitions were inserted between the cathode compartment and the cathode reservoir. The cathode compartment was then filled with ions traveling much faster than the nitrogen, in this case, cations so that no nitrogen could reach the cathode compartment. The $^{15}N$ content of the original solution was 2.94% $^{15}N$. In closed operation the following separations were observed:

| Time in hours | $\Delta_\gamma$, percent | Separation factor $q$ |
|---|---|---|
| 23.25 | 1.82 | 1.8 |
| 143 | 4.12 | 4.22 |

Example 3

The separation of rubidium isotopes was effected, based on the different mobilities of the Rb-ions, using apparatus which was basically similar to that used in Examples 1 and 2. The relevant data in respect of the apparatus and the operating conditions was as follows:

Column diameter _____ 4.0 cm.
Cooling tube diameter _____ 1.1 cm.
Overall length _____ 11.3 cm.
Length of cathode compartment 20 _____ 2.2 cm.
Length of cathode reservoir 23 _____ 2.2 cm.
Length of separator sections 11, 21, 12 __ 4.4 cm.
Length of anode reservoir 25 _____ 1.9 cm.
Length of de-ionizing section 13 _____ 2.4 cm.
Length of anode compartment 22 _____ 1.5 cm.
Number of plates in separation section __ 18.
Number of plates per centimeter of the separator section _____ 4.1 pl./cm.
Number of plates in de-ionizing section _ 5.
Permeable area of each partition _____ 2.0 sq. cm.
Current _____ 0.516 amp.
Rate of flow of solution _____ 2.00 cm./min.
Acetic acid concentration of the counter-flow _____ 0.50 mol/liter.

Example 3—Continued

Concentration of ions to be separated in
  the solvent _____ 0.10 mol/liter.
Mean operating temperature _____ 55° C.
Voltage without de-ionizing section ____ 104 volts.
Voltage across the de-ionizing section ___ 89 volts.

Ordinary rubidium was used so that the isotopes to be separated were present in the relative proportions in which they occur naturally. In closed operation, the following separation was achieved:

| Time in hours | Percent | Separation factor $q$ |
|---|---|---|
| 12.6 | 2.1 | 1.112 |
| 47.6 | 3.1 | 1.167 |
| 101.1 | 3.3 | 1.177 |

From these data, it can be inferred that the difference between the mobilities of the two rubidium ions was: $\epsilon = 1.0 \cdot 10^{-3}$. The separation thus corresponded to 163 plates, or 37 plates per centimeter.

In separating rubidium isotopes according to the Ramirez method (see Helvetica Chimica Acta, volume 36, Fasc. 5), a separation factor of only $q = 1.084$ ($\Delta_\gamma = 1.6\%$) was obtained in a plant having a column length of 1 meter. Thus, using a column in this plant which is 22 times as long as that used in this example, the degree of separation achieved was only half as good.

Examples 4, 5 and 6

In these examples, the process was used to separate calcium from strontium, the separation being based on the different mobilities of the Ca·· and Sr·· ions. The apparatus used did not include a deionizing section, and the anode was exposed to a continuous flow of a solution having the initial concentration.

Initially, the apparatus contained 10% Sr and 90% Ca. The difference of the ion mobilities of Ca·· and Sr·· under the conditions of the experiment was $\epsilon = 0.036$. When the apparatus was adjusted, that is to say, the mole fraction in the cathode compartment had ceased to vary, the following separations were obtained:

| Example | $\gamma$(cathode comp.) | $\Delta_\gamma$ | Separation factor $q$ | Plate number (pl.) |
|---|---|---|---|---|
| 4 | 72.7 | 62.7 | 23.5 | 88 |
| 5 | 36.0 | 26.0 | 4.8 | 45 |
| 6 | 45.0 | 35.0 | 6.97 | 53 |

The experiments 4 and 5 show that the plate number is exactly proportional to the length of the separator section (number of partitions). The relevant data for these examples were as follows:

| | Example 4 | Example 5 | Example 6 |
|---|---|---|---|
| Column diameter _____ cm | 4.0 | 4.0 | 8.2 |
| Cooling tube diameter _____ cm | 1.1 | 1.1 | 2.2 |
| Overall length _____ cm | 7.6 | 7.0 | 7.1 |
| Length of the cathode compartment (20) _____ cm | 3.05 | 3.05 | 2.5 |
| Length of the cathode reservoir (23) cm | 3.05 | 3.05 | 2.5 |
| Length of the separator section (11, 21 and 12) _____ cm | 1.1 | 0.5 | 0.90 |
| Length of the anode compartment (22) cm | 3.45 | 3.45 | 3.8 |
| Number of plates in the separator section | 8 | 4 | 4 |
| Number of plates per cm. of the separator section | 7.3 | 8.0 | 4.5 |
| Permeable area of each partition sq. cm | 4.65 | 4.65 | 21 |
| Current _____ amps | 0.418 | 0.418 | 1.17 |
| Rate of flow of solution ____ cc./min | 1.70 | 1.70 | 4.7 |
| Acetic acid concentration of the counter flow _____ mol/liter | 0.28 | 0.28 | 0.28 |
| Concentration of ions to be separated in the solution _____ mol/liter | 0.05 | 0.05 | 0.05 |
| Mean operating temperature ____ ° C | 37 | 37 | 30 |
| Voltage without deionizing section volts | 78 | 78 | 56 |

Example 7

The process as used to separate an antibiotically effective component from a mixture of organic cations. The active compound belonged to the faster components of the mixture and therefore accumulated towards the cathode. In order to prevent destruction of the substance at the cathode, the separation column was provided at its upstream end with a de-ionizing section. In its basic constructions the apparatus was similar to that shown in FIG. 3, but it differed in that, between the spaces 20 and 23, several plates were inserted to form the upper de-ionizing section.

At the lower end of this de-ionizing section, that is between the upper de-ionizing section and the actual separating column, an auxiliary supply of Na+ was added in the form of drops of a 0.1-m sodium acetate solution. The sodium ion travelled faster than all other cations of the mixture and thus took over the conduction of the cation stream in the space before the cathode. The organic cations travelled only up to the lower end of the trough section which contained sodium ions and thus did not establish contact with the cathode.

The feeding of sodium acetate solution was automatically controlled by a small metering cell at the lower end of the upper de-ionizing section. On excessive feeding of sodium acetate, sodium ions would proceed also into the separator section, and this would raise the conductivity at the metering point, whereupon the sodium acetate feed would be interrupted. Eventually the sodium ions travelled to the cathode where they were partly removed by the stream flowing past the cathode. When the solution in the metering cell became impoverished of sodium ions, conductively dropped, whereupon the sodium acetate feed was re-started. In this way the limit between organic cations and the auxiliary ion Na+ could be kept constant at a certain distance from the cathode.

The relevant data were as follows:

Plate diameter _____ 4.0 cm.
Cooling tube diameter _____ 1.2 cm.
Overall length _____ 17 cm.
Permeable area of each partition ____ 1.8 sq. cm.
Number of plates per centimeter ____ 3.3.
Number of plates in the upper de-
  ionizing section _____ 6.
Number of plates in the separator
  section _____ 24.
Number of plates in the lower de-
  ionizing section _____ 6.
Current in the separator section ____ 55 milliamps.
Current in the lower de-ionizing sec-
  tion _____ 90 milliamps.
Rate of flow of solution _____ 0.65 cc./min.
Acetic acid concentration _____ 0.3-n.
Stock solution containing the auxil-
  iary ion _____ 0.1-n sodium acetate in 0.3-n acetic acid.
Concentration of the substance to be
  separated in the separator section __ 0.5%.
Potential drop in separator section __ 160 volts.
Mean operating temperature _____ 18° C.

In order to establish clearly the maximum obtainable degree of separation of the active component, the apparatus was first run in closed operation. The separator section was charged with a 0.5% solution of the mixture in 0.3-n acetic acid. 1 mg. of the original substance had an activity of 23% as compared with a reference sample having 100% which was purified by means of paper electro-phoresis. After 24 hours' operation, a sample derived near the upper end of the separator section showed an activity of 100%, and a sample from the lower third of the separator section an activity of only 75%.

Under continued treatment the active substance was extracted from the aqueous solution. It does not matter therefore if, during the continuous removal, some sodium acetate from the upper de-ionizing portion is included in the removed product.

What is claimed is:

1. In an apparatus for separating substances by counter-flow ion migration, comprising a vessel having a longitudinal axis, a plurality of partition walls transversely disposed to said axis and dividing said vessel into a series of compartments, each of said partition walls having a series of compartments, each of said partition walls having a plurality of pores constituting fine channels therethrough, feed means for introducing a liquid medium into one of said compartments at one end of said vessel, discharge means for withdrawing said liquid medium at a compartment at the opposite end of said vessel, said vessel thereby constituting a conduit for flow of said liquid medium from said feed means to said discharge means through said partition wall channels, entry means for feeding a substance having ions of the same polarity, but different migration velocities, which are to be separated, into said vessel intermediate said compartments at the ends thereof, and means for applying a directed electrical field to said conduit causing said ions to migrate in the direction opposite to said liquid flow through said conduit, the improvement consisting of the length of each of said compartments from wall to wall being several times the thickness of the walls adjoining the compartment said walls consisting of fine-mesh nylon sieves of substantially uniform thickness, thereby causing convection to take place substantially only in a direction perpendicular to the direction of flow through said compartment.

2. The improvement of claim 1 wherein the nylon sieves have apertures of about 50 microns.

References Cited in the file of this patent

UNITED STATES PATENTS

| | | |
|---|---|---|
| 1,579,138 | Petz | Mar. 30, 1926 |
| 1,597,553 | Stuart | Aug. 24, 1926 |
| 2,566,308 | Brewer | Sept. 4, 1951 |
| 2,784,158 | Bodamer et al. | Mar. 5, 1957 |

OTHER REFERENCES

Graham: Electroplating Engineering Handbook, 1955, page 577.